Dec. 22, 1936.   M. T. ZAROTSCHENZEFF   2,065,358
METHOD OF CHILLING ANIMAL CARCASSES
Filed Oct. 12, 1933
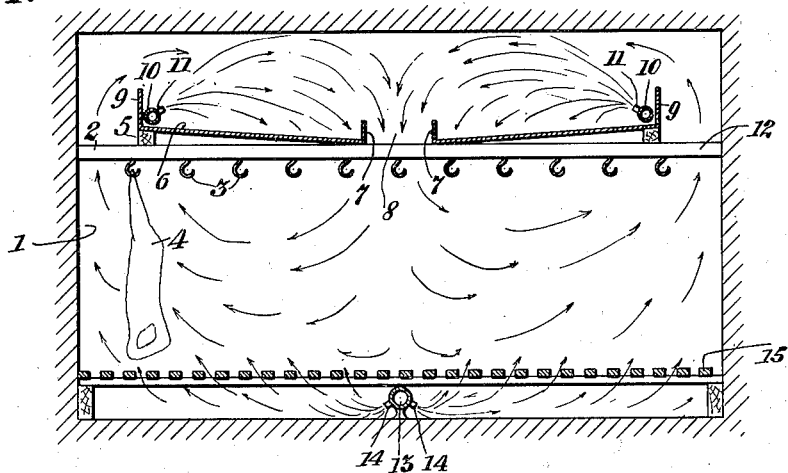
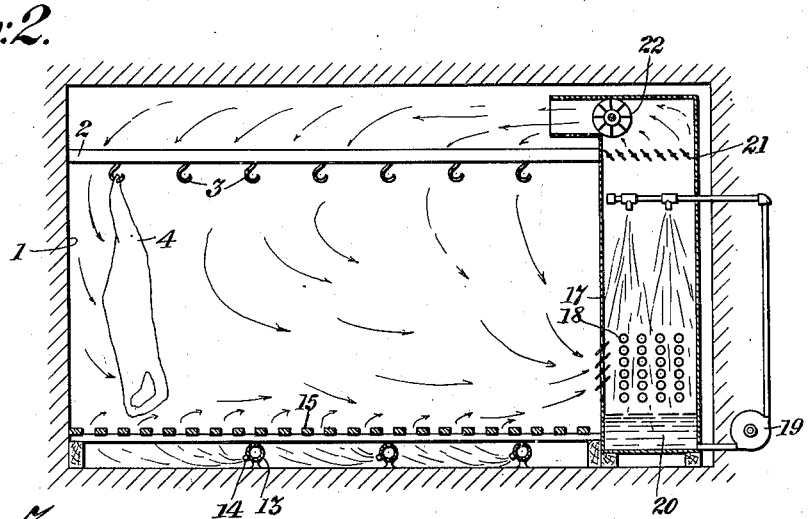
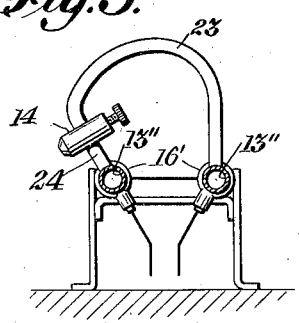
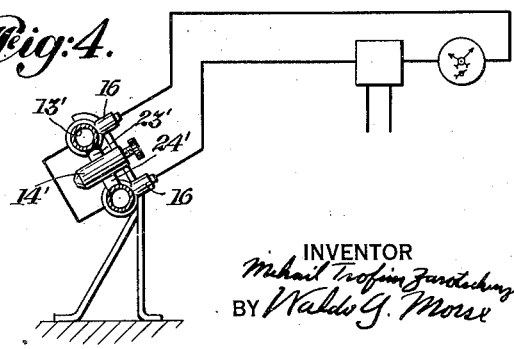
INVENTOR
Mihail Trofim Zarotschenzeff
BY Waldo G. Morse
ATTORNEY Patented Dec. 22, 1936

2,065,358

UNITED STATES PATENT OFFICE 2,065,358

METHOD OF CHILLING ANIMAL CARCASSES

Mihail Trofim Zarotschenzeff, New York, N. Y., assignor, by mesne assignments, to Z Processes Inc., Jersey City, N. J., a corporation of Delaware Application October 12, 1933, Serial No. 693,267

4 Claims. (Cl. 99—194)

This invention relates to a method of chilling animal carcasses.

Most animal flesh used for food is chilled before consumption. The chilling is usually accomplished in meat packing houses by placing the carcasses into cold rooms refrigerated in any well known manner immediately after slaughtering. The body temperature of the carcasses is between 100 and 105 degrees Fahrenheit. In spite of the fact that the relative humidity is maintained as high as possible in present chilling methods, considerable loss of weight occurs because the carcass, being warm, warms up the film of air surrounding it, thereby reducing the relative humidity of such film of air and causing transfer of moisture from the carcass to the surrounding air film. In other words, the meat loses a considerable percentage of its moisture content. This loss of moisture content not only effects a monetary loss to the packer, but also slightly affects the quality of the meat.

This invention relates to a method of chilling which can be used in connection with almost any known apparatus for chilling carcasses at present in use as it is independent of the source and kind of refrigeration. My method provides an artificial means for the maintenance of a very high humidity during the initial stages of the chilling, and contemplates an increase in the motion of air in the chilling chamber, thereby reducing the time rate of chilling due to the fact that very humid air is moved in contact with the carcasses.

Among the objects of my invention is to provide a method whereby animal flesh can be chilled more rapidly, thus retarding the growth of bacteria and molds.

A further object of my invention is to maintain a predetermined temperature of the air whereby the flesh is not frozen on the outside.

Still another object of my invention is to obtain a uniform chilling throughout the carcasses by surrounding the carcasses by a moving atmosphere.

Still another object of the invention is to provide a proper atmosphere surrounding the carcasses to prevent excessive drying thereof, loss in weight, and discoloration.

A still further object of the invention is to control the degree of supersaturation of the atmosphere whereby it may be changed to inversely conform with the change in the temperature of the carcasses.

Referring to the drawing:

Figure 1 is a cross sectional view of a chilling chamber embodying therein the principles of my invention.

Figure 2 is a cross sectional view of a modified form of chilling chamber having a unit cooling system and embodying the principles of my invention.

Figure 3 is a detail view of a form of nozzle, supply connections and valve control.

Figure 4 is a detail view of a modified form of nozzle, supply connections and valve control.

The carcasses are placed in the chilling rooms at a surface temperature of between 100 and 105 degrees Fahrenheit. It is desirable to chill as quickly as possible. Therefore, it has been customary to at least reduce the air in the chilling room to 32 degrees Fahrenheit or even less. The difference between the relative humidity of saturated air at 32 degrees Fahrenheit and at 100 degrees Fahrenheit is approximately 17.778 grains, so that there is an enormous absorptive power in the air contacting with the surface of the carcass which becomes heated to the approximate temperature of the carcass. This causes the subtraction of moisture from carcass and the absorption by the surrounding air, thereby reducing its weight. By my method the carcass is surrounded by an atmosphere that is enormously supersaturated and, as the air surrounding the carcass heats up, it absorbs the moisture content in the atmosphere and cannot take up any moisture from the carcass. As the carcass cools down the conditions become less acute and it is therefore desirable to reduce the degree of supersaturation. Aside from the question of shrinkage, the problem of surrounding the carcasses with the proper type of supersaturated atmosphere is of extreme importance. Water upon the carcass gives discoloration and a slimy appearance, making the product less saleable and desirable. By my method and apparatus, I circulate air of a desired temperature and add in a particular manner moisture in such a form that it is carried by the circulating air to surround the carcass with an atmosphere of what may be described as supersaturated air.

In connection with the loss in weight of carcasses I have found that the usual shrinkage (expressed in the percentage loss in weight as compared to the original hot weight) for beef or pork is 2% to 3%. For calves, poultry and sheep it is still greater. In a medium size packing house which slaughters five thousand hogs a week, the saving of one per cent will represent fifty hogs, which, over a period of a year, amounts to twenty-five hundred hogs. By my method at least one per cent in shrinkage is saved.

In carrying out my invention, I propose to utilize any well known method and apparatus for the chilling of carcasses wherein the cooling medium is caused to circulate around the carcasses.

In Figure 1, I have shown my invention in connection with a cooling system generally known as the Overhead Bunker Cooler. The chilling room 1 has a superstructure resting on cross beams 2 carrying hooks 3 on which the carcasses 4 are suspended. Above the cross beams 2 are stringers 5 which help to support the sloping floors 6 of the bunkers. In Figure 1, I have shown a double type bunker wherein the shorter sides 7 of the bunkers are opposite one another with an intervening space 8 for the passage of the chilled air. Header pipes 10 for the cooling medium are provided adjacent the sides 9, the header pipes being provided with nozzles 11 spraying towards the shorter side 7. Brine or other cooling medium may be used. The circulation of the cooling air is downwardly through opening 8 between the shorter ends of the bunkers, through the chilling chamber 1, and upwardly through passages 12 adjacent the walls of the chilling chamber. Along the floor I place a header or a plurality of headers 13 which are fed from the ordinary water supply and with compressed air from a source of supply. Nozzles 14 direct and control the flow of the water spray. I have found that steam was not desirable in connection with my invention due to the large cost of condensing the steam and that ordinary pressure water sprays do not provide fine enough division of the water. I have found, however, that compressed air is satisfactory, resulting in a fine division of the water and also intimately mixing the water with air as it is directed into the chilling chamber. In addition, the compressed air accelerates the air movement of the chilling system which is particularly desirable because with still air uniformity of chilling in the carcass is not obtained. It should be noted that I preferably direct my sprays downwardly at an angle to the horizontal resulting in a change in direction thereof. The result of the foregoing is particularly significant in that the heavy particles of water are effectively separated from the atmosphere which is directed around the carcass, such heavy particles being collected and returned or removed from the chamber in a suitable fashion. Discoloration of the carcass is thus effectively prevented. It will be seen that this manner of introducing the moisture insures a moisture-laden chilling air wherein the particles of moisture are extremely minute and function effectively to chill, as well as prevent substantial drying of the carcass. Inasmuch as these fine moisture particles are carried, in the supersaturated chilling air, around the carcass, they are further chilled by the atmosphere coming from the bunker portion of the apparatus. The atmosphere surrounding the carcass is thus continuously changed and is supersaturated continuously with fresh water thereby preventing the possibility of contamination or bacteriological formations. This condition is secured because the compressed air has a sterilizing effect. Above the header 13 I provide a false floor or grating 15 to enable the meat handlers to have a dry footing.

As the surface temperature of the carcasses falls it is desirable to decrease the quantity of supersaturation and hence I propose to provide any well known method whereby the valves of the headers may be controlled. This may be accomplished by a suitable control mechanism which closes the valves gradually or by closing certain of them entirely, leaving others open or in any other well known manner. In this connection, I have found by actual experiment, that the greatest loss occurs during the initial hour of chilling. The usual time of chilling for hogs is twenty-four hours. I have found that the sprays on the floor of the chilling chamber may be almost entirely shut off after about six hours.

In Figure 4, I have shown diagrammatically, in connection with a header 13' and nozzle 14', a time clock for electrically closing the header valves 16 after a predetermined interval has passed. Such time clocks are well known.

I have shown a modified form of cooling chamber in Figure 2 wherein the unit cooler system is used. This may either be a brine cooler as shown, or any other form whereby air is chilled to the desired temperature. No claim is made to the type of unit cooler. As shown, there is a container 17 having banks of cooling coils 18, a circulating pump 19 for brine 20, eliminators 21, and a blower 22. It is, however, desirable to have the unit cooler take its air from adjacent the floor and discharge it above the cross beams 2 upon which the carcasses 4 are supported by hooks 3 whereby a circulation of the cooled air is secured. In a similar fashion the manifolds for the water and compressed air nozzles are placed on the floor of chamber 20.

I have shown several forms of nozzles 14, 14', and supply connections together with a diagrammatic method of controlling the supply valves 16, 16'. It also is possible to control the valves by means of thermocouples secured against the surface of a carcass. The headers 13, 13', may supply the nozzles 14, 14', in various ways as indicated either by expansion supply pipes 23, 24, as shown in Figure 3 or by direct connection 23', 24' in Figure 4, or the nozzle case can be integral with the headers. Modifications of the control method may be made and still fall within the scope of my invention.

Although I have utilized the floor as a baffle to obtain the separation and gradation of the water particles whereby only particles of a desired size will be injected into the atmosphere surrounding the carcasses, yet it is possible to utilize any form of baffle whereby the direction of motion of the medium is changed.

It will thus be seen that I have provided a method and apparatus for the chilling of animal carcasses whereby the present shrinkage losses will be decreased with a resultant better product and one which will not materially increase the cost of installation of a chilling room.

What I claim is:

1. The method of chilling animal carcasses in a chamber comprising creating an atomized liquid refrigerant, removing from the refrigerant heavy liquid particles which would form water upon the carcass, and directing the remaining refrigerant about the carcass in the chamber, whereby the carcass is chilled in a moisture-laden atmosphere which is free from particles forming water upon the carcass.

2. The method of chilling animal carcasses in a chamber comprising creating an atomized liquid refrigerant, removing from the refrigerant, heavy liquid particles which would form water upon the carcass, and directing the remaining refrigerant about the carcass in the chamber, directing a separate current of atomized liquid refrigerant into the lower part of the chamber, and removing from the separate current heavy liquid particles which would form water upon the carcass, whereby the carcass is chilled in a moisture-laden atmosphere which is free from particles forming water upon the carcass.

3. The method of chilling animal carcasses in a chamber comprising creating an atomized liquid refrigerant, forming the liquid refrigerant as a moisture-laden atmosphere, directing the said atmosphere initially about the carcass in the chamber, and subsequently reducing the moisture content of the atmosphere after predetermined chilling of the carcass has been effected.

4. The method of chilling animal carcasses in a chamber comprising creating an atomized liquid refrigerant, removing heavy liquid particles which would form water upon the carcass from the refrigerant, forming the liquid refrigerant as a supersaturated moisture-laden atmosphere, directing the said atmosphere initially about the carcass in the chamber, and subsequently reducing the moisture content of the atmosphere after predetermined chilling of the carcass has been effected.

MIHAIL TROFIM ZAROTSCHENZEFF.